(12) United States Patent
Clark et al.

(10) Patent No.: US 9,434,412 B2
(45) Date of Patent: Sep. 6, 2016

(54) APPARATUSES AND METHODS FOR STEERING A VEHICLE

(75) Inventors: Brian M. Clark, Seattle, WA (US); David Reed, Everett, WA (US); Jim Dean, Redmond, WA (US); Mark Case, Duvall, WA (US); Justin Stansberry, Mill Creek, WA (US)

(73) Assignee: Terex South Dakota, Inc., Watertown, SD (US)

( * ) Notice: Subject to any disclaimer, the term of this patent is extended or adjusted under 35 U.S.C. 154(b) by 828 days.

(21) Appl. No.: 12/861,406

(22) Filed: Aug. 23, 2010

(65) Prior Publication Data
US 2012/0043159 A1  Feb. 23, 2012

(51) Int. Cl.
| B66F 11/00 | (2006.01) |
| B62D 7/15 | (2006.01) |
| B66F 9/065 | (2006.01) |
| B66F 11/04 | (2006.01) |

(52) U.S. Cl.
CPC .............. B62D 7/1509 (2013.01); B66F 9/065 (2013.01); B66F 11/044 (2013.01)

(58) Field of Classification Search
CPC ....... B66F 11/00; B66F 11/04; B66F 11/044; B66F 11/046; B66F 9/065; B62D 7/1509
USPC ............................................ 182/2.1, 2.2, 2.3
See application file for complete search history.

(56) References Cited

U.S. PATENT DOCUMENTS

| 2,945,544 A | * | 7/1960 | Jacobus ........................ 180/433 |
| 3,185,245 A | * | 5/1965 | Hoyt ............................. 180/414 |
| 3,528,524 A | * | 9/1970 | Birbanescu et al. ........... 182/2.3 |
| 3,708,037 A | * | 1/1973 | Tranchero ...................... 182/2.3 |
| 3,724,585 A | | 4/1973 | Conrad |
| 4,029,165 A | * | 6/1977 | Miller et al. ................. 180/6.48 |
| 4,241,803 A | * | 12/1980 | Lauber .......................... 180/8.1 |
| 4,387,814 A | * | 6/1983 | Beduhn et al. ............... 212/195 |
| 4,558,758 A | | 12/1985 | Littman et al. |

(Continued)

FOREIGN PATENT DOCUMENTS

| DE | 9006521 U1 | 9/1990 |
| WO | 2008042244 A3 | 4/2008 |

OTHER PUBLICATIONS

International Search Report and Written Opinion for corresponding PCT Application No. PCT/US2011/048417, mailed Jan. 19, 2012, 11 pages.

(Continued)

Primary Examiner — Colleen M Chavchavadze
(74) Attorney, Agent, or Firm — Brooks Kushman P.C.

(57) ABSTRACT

A vehicle is provided with a chassis having a footprint, a load carrying structure, and a support assembly coupling the chassis and the structure. The support assembly is adapted to move the structure relative to the chassis between a stowed position and a deployed position outboard of the footprint of the chassis. A plurality of wheels is configured to roll on the support surface and a plurality of axles coupling the wheels to the chassis are provided. Each axle includes at least one spindle supporting an individual wheel for rotation on a spindle axis. A steering system is adapted to position the wheels between driving and rotation arrangements with respect to the chassis such that in the rotating arrangement each of the plurality of wheels rotate relative to the chassis whereby the chassis, the platform and the support assembly may rotate in unison about the steer axis.

18 Claims, 6 Drawing Sheets

(56) References Cited

U.S. PATENT DOCUMENTS

| | | | |
|---|---|---|---|
| 4,579,182 A * | 4/1986 | Dewing et al. | 180/9.46 |
| 4,599,030 A | 7/1986 | Skaalen et al. | |
| 5,899,292 A * | 5/1999 | Paul et al. | 180/419 |
| 6,311,795 B1 * | 11/2001 | Skotnikov et al. | 180/8.3 |
| 6,371,243 B1 * | 4/2002 | Donaldson et al. | 182/69.4 |
| 6,705,823 B2 | 3/2004 | Bohata | |
| 6,827,176 B2 * | 12/2004 | Bean et al. | 180/411 |
| 7,182,173 B2 * | 2/2007 | Bailey | 182/2.1 |
| 8,701,801 B2 * | 4/2014 | Itou | B60K 7/0007 180/234 |
| 2009/0178876 A1 * | 7/2009 | Miki | B62D 7/142 180/411 |
| 2010/0021234 A1 * | 1/2010 | Willis et al. | 404/90 |
| 2015/0014952 A1 * | 1/2015 | Morikawa | B62D 7/1509 280/91.1 |

OTHER PUBLICATIONS http:www.jeep-hurricane.com/Jeep-Hurricane-Steering.php, "Jeep Hurricane Steering", 2006-2009, 1 page.

www.manliftengineering.com/products/omni/pdf/4188-Omni.pdf, "Omni-Motion Drive Scissor Lifts", Mar. 3, 2010, 2 pages.

International Preliminary Report on Patentability for corresponding Application No. PCT/US2011/048417, mailed Mar. 7, 2013, 9 pages.

* cited by examiner

APPARATUSES AND METHODS FOR STEERING A VEHICLE

TECHNICAL FIELD

The following disclosure relates generally to vehicles for lifting a load with respect to a support surface. In particular, the following disclosure relates to vehicles that have support assemblies for moving a load carrying structure between stowed and deployed positions with respect to a chassis.

BACKGROUND

Vehicles such as a conventional mobile aerial work platform, particularly those that include a boom, are frequently maneuvered into locations that are in close proximity to structures, supplies or other obstacles. Conventionally, such vehicles are maneuvered using a steering axle and a propulsion source driving at least two wheels in the same direction at approximately the same speed. Accordingly, these conventional vehicles are maneuvered by driving forward and backward while turning or pivoting the wheels on the steering axle. It is often difficult for such vehicles to maneuver into tight locations and/or get optimally oriented at the location to provide maximum load lifting capabilities.

Vehicles such as a conventional mobile aerial work platform, particularly those that include a boom for a platform or a telehandler, typically have an upper swing chassis supporting the lifting structure that rotates relative to the driving chassis of the vehicle on a vertical axis to allow access for the lifting structure to sweep through 360 degrees of range without repositioning or driving the vehicle. These vehicles typically have a rectangular footprint and stability is reduced when the boom is rotated to the side of the vehicle and counterweight or other ground supports must be added to maintain stability.

Some other conventional vehicles are maneuvered with a so-called skid steer system that drives wheels or tracks on opposite sides of the vehicle in different directions or at different speeds. Because the wheels or tracks of skid steer vehicles do not pivot, there is a portion of the driving traction that does not coincide with a turning path. This effect is generally referred to as "scrub" or "scrubbing" and can result in excessive wheel wear and/or terrain damage.

SUMMARY

In an embodiment, a vehicle for lifting a load with respect to a support surface is provided with a chassis having a footprint and a vertical axis. A load carrying structure is adapted to carry a load. A support assembly couples the load carrying structure and the chassis. The support assembly is adapted to move the load carrying structure relative to the chassis between a stowed position and a deployed position, where the deployed position is outboard of the footprint of the chassis. A plurality of wheels is adapted to roll on an underlying support surface with each wheel interfacing with the underlying surface through a respective contact patch. A plurality of axles couples the wheels to the chassis. Each of the plurality of axles includes at least one spindle adapted to support one of the plurality of wheels for rotation about a spindle axis. A steering system is coupled to the plurality of wheels and being adapted to position the wheels between a driving arrangement and a rotating arrangement relative to the chassis, such that in the rotating arrangement each spindle axis of the plurality of wheels intersect a steer axis such that with the plurality of wheels in the rotating arrangement, a first and a second wheel of the plurality of wheels are rotated in a first direction relative to the chassis and a third and a forth wheel of the plurality of wheels are rotated in a second direction that is opposite the first direction whereby the chassis, the platform and the support assembly rotate in unison about the steer axis.

In another embodiment, a drivable lift assembly for lifting a load with respect to a support surface is provided with a chassis. A load carrying structure is mounted to the chassis and adapted to carry a load. A support assembly couples the load carrying structure and the chassis. The support assembly is adapted to move the load carrying structure relative to the chassis between a stowed position and a deployed position. The load carrying structure has a raised center of gravity in the deployed position. The support assembly is rotationally fixed relative to the chassis. A plurality of wheels is adapted to roll on an underlying support surface with each wheel interfacing with the underlying support surface through a respective contact patch. A plurality of axles couples the wheels to the chassis. Each of the plurality of axles includes at least one spindle adapted to support one of the plurality of wheels for rotation about a spindle axis. Each of the plurality of axles includes a king pin axis to pivotally couple each spindle relative to the chassis, the king pin axes offset from the contact patches of the wheels on an inboard side of the vehicle. A steering system is coupled to the plurality of wheels and is adapted to position the wheels between a driving arrangement and a rotating arrangement relative to the chassis. In the rotating arrangement, each spindle axis of the plurality of wheels intersects a steer axis. A propulsion system is coupled to the plurality of wheels and adapted to drive the plurality of wheels. The propulsion system rotates a first and a second wheel of the plurality of wheels in a first direction relative to the chassis and rotates a third and a forth wheel of the plurality of wheels in a second direction that is opposite the first direction whereby the chassis, the platform and the support assembly rotate in unison about the steer axis.

In yet another embodiment, a method for operating a vehicle having a load carrying structure for carrying a load, a chassis having a footprint, a plurality of wheels supporting the chassis with respect to a support surface, and a support assembly moving the load carrying structure between stowed and deployed positions with respect to the chassis is provided. The vehicle is positioned adjacent to a target site in a first angular position relative to the target site. The support assembly is moved horizontally outboard of the chassis footprint and vertically relative to the work site to vertically position the load carrying structure in a selected position relative to the target site. The plurality of wheels is moved to a steer mode. A first pair of the plurality of wheels is toed-in. Individual axes of rotation of the first pair of wheels mutually intersect a steer axis of the vehicle when toeing-in the first pair of wheels. Each of the first pair wheels is positioned to roll along a circular path about the steer axis. A second pair of the plurality of wheels is toed-out. Individual axes of rotation of the second pair wheels mutually intersect the steer axis of the vehicle when toeing-out the second pair of wheels. Each of the second pair wheels is positioned to roll along the circular path about the steer axis. At least one of the wheels is driven whereby the four wheels roll along the circular path. The chassis, the support assembly and the platform are rotated as a unit about the steer axis.

DETAILED DESCRIPTION

As required, detailed embodiments are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the disclosed embodiments.

Figure 1:
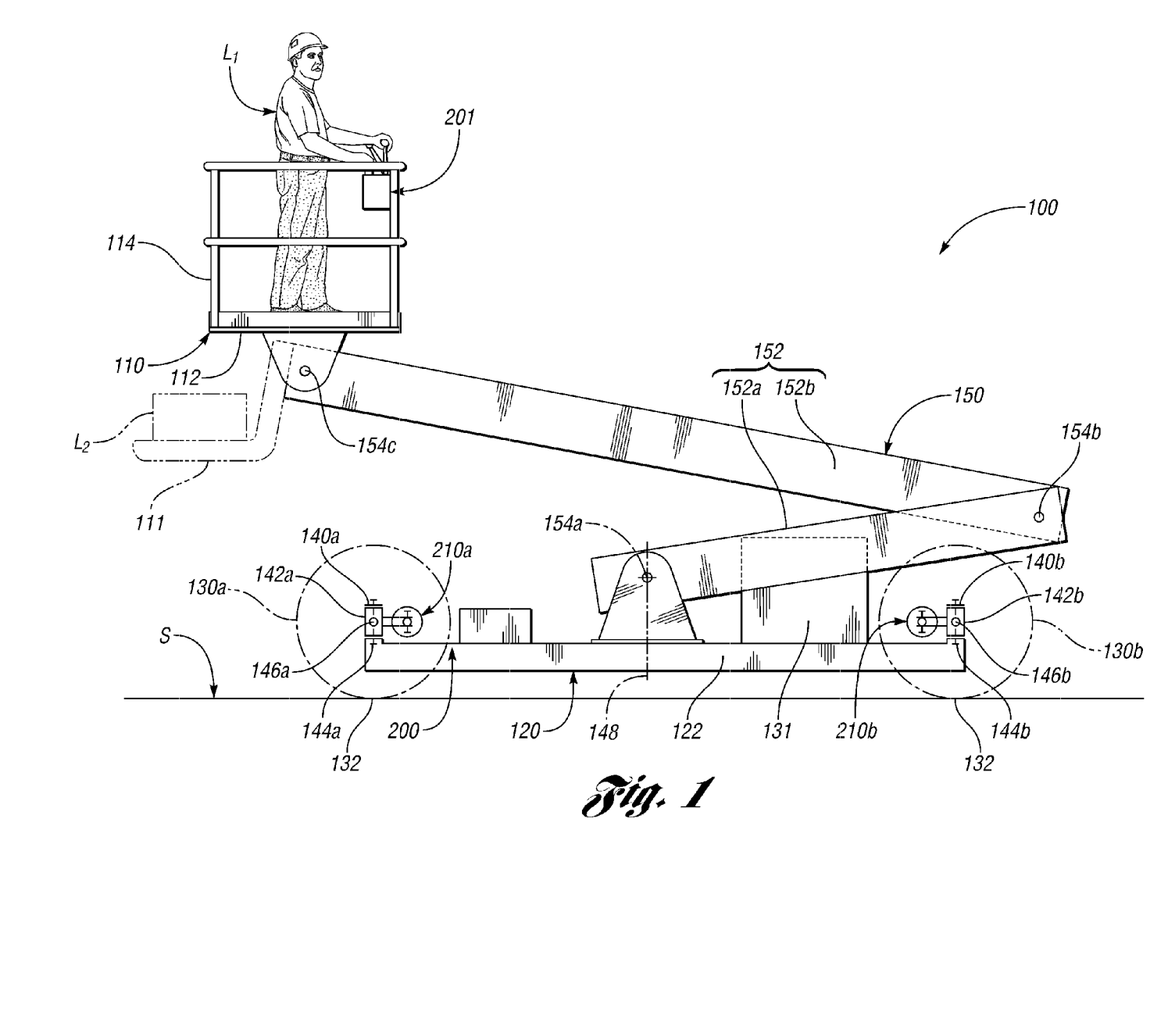
FIG. 1 is a partially schematic side elevation view of an embodiment of a vehicle including a steering system in accordance with the present disclosure.
Figure 2:
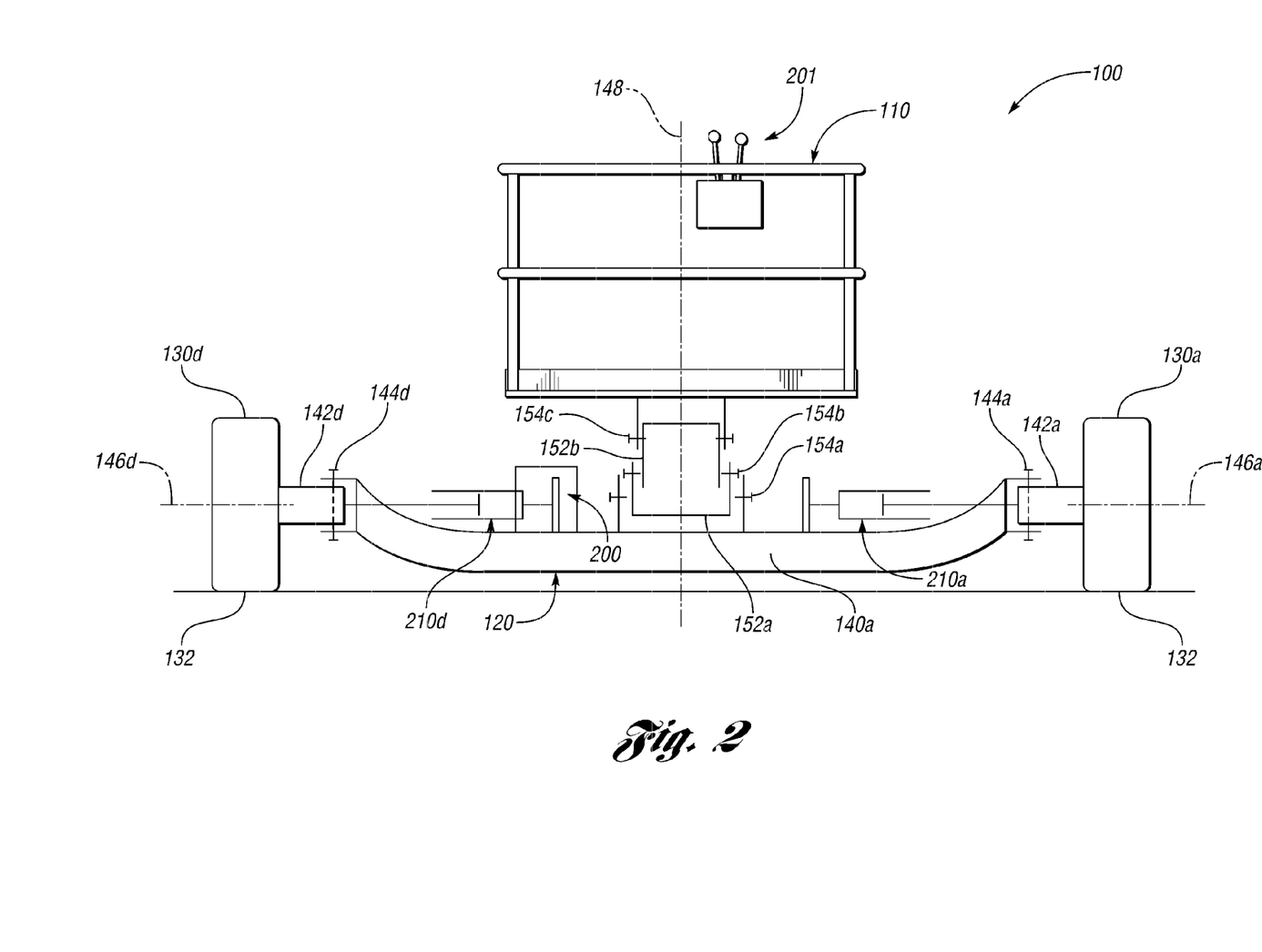
FIG. 2 is a partially schematic front elevation view of an embodiment of the vehicle shown in FIG. 1.

FIG. 1 is a partially schematic side elevation view of an embodiment of a vehicle 100 including a steering system in accordance with the present disclosure. FIG. 2 is a partially schematic front elevation view of the vehicle 100 shown in FIG. 1. The vehicle 100 may be a utility vehicle such as an aerial work platform, a rough terrain telescopic load handler, a telehandler, or another vehicle suitable for lifting a load $L_1$ with respect to a support surface S. The load $L_1$ can be, for example, one or more persons, tools, cargo, or any suitable material that may require being lifted. The support surface S can be paved or unpaved ground, a road, an apron such as a sidewalk or parking lot, an interior or exterior floor of a structure, or other suitable surfaces upon which the vehicle 100 can be driven.

With reference to FIG. 1, the vehicle 100 includes a load carrying structure 110, a chassis 120, and a support assembly 150 that couples the load carrying structure 110 and the chassis 120. In one embodiment, the load carrying structure 110 shown in FIG. 1 is a platform although any suitable load carrying structure 110 is contemplated within the scope of the disclosed embodiments. As illustrated, the load carrying structure 110 is a platform that includes a deck 112 with a railing 114 mounted on the deck 112. Such a load carrying structure 110 may be suited to carrying one or more persons and any tools or supplies that they may need. In another embodiment, illustrated in phantom, the load carrying structure is a fork 111 to carry a load $L_2$.

Figure 3:
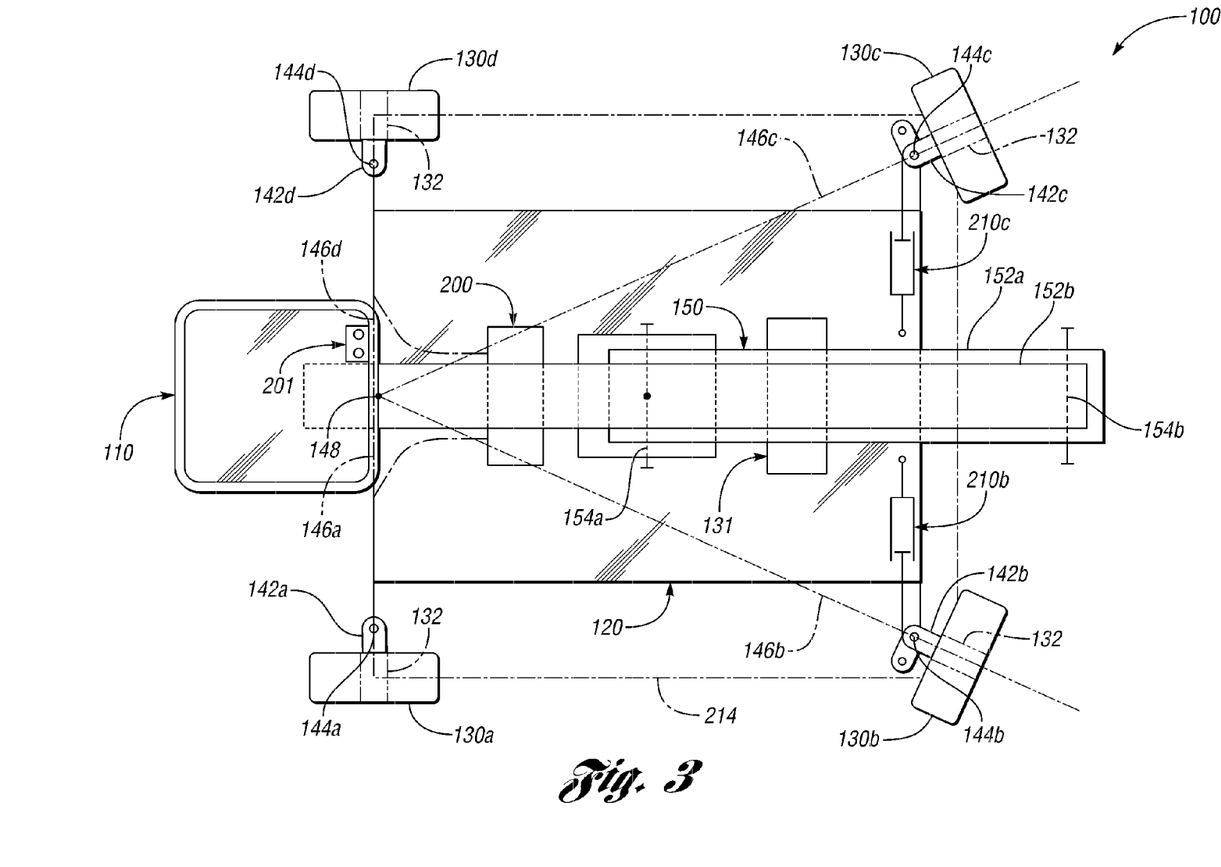
FIG. 3 is a partially schematic top plan view of an embodiment of the vehicle shown in FIG. 1 having an arrangement of the steering system in accordance with the present disclosure.
Figure 4:
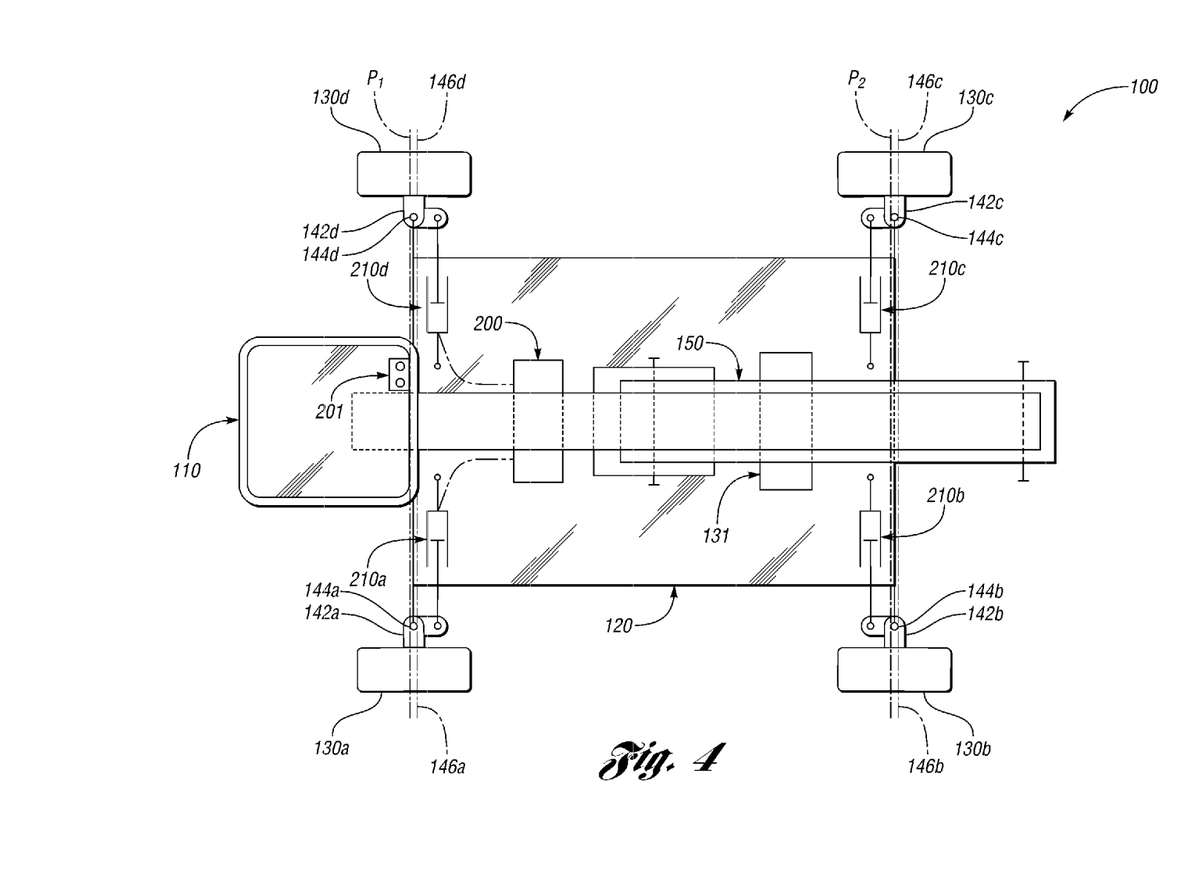
FIG. 4 is a partially schematic top plan view of an embodiment of the vehicle shown in FIG. 1 having another arrangement of the steering system in accordance with the present disclosure.
Figure 5:
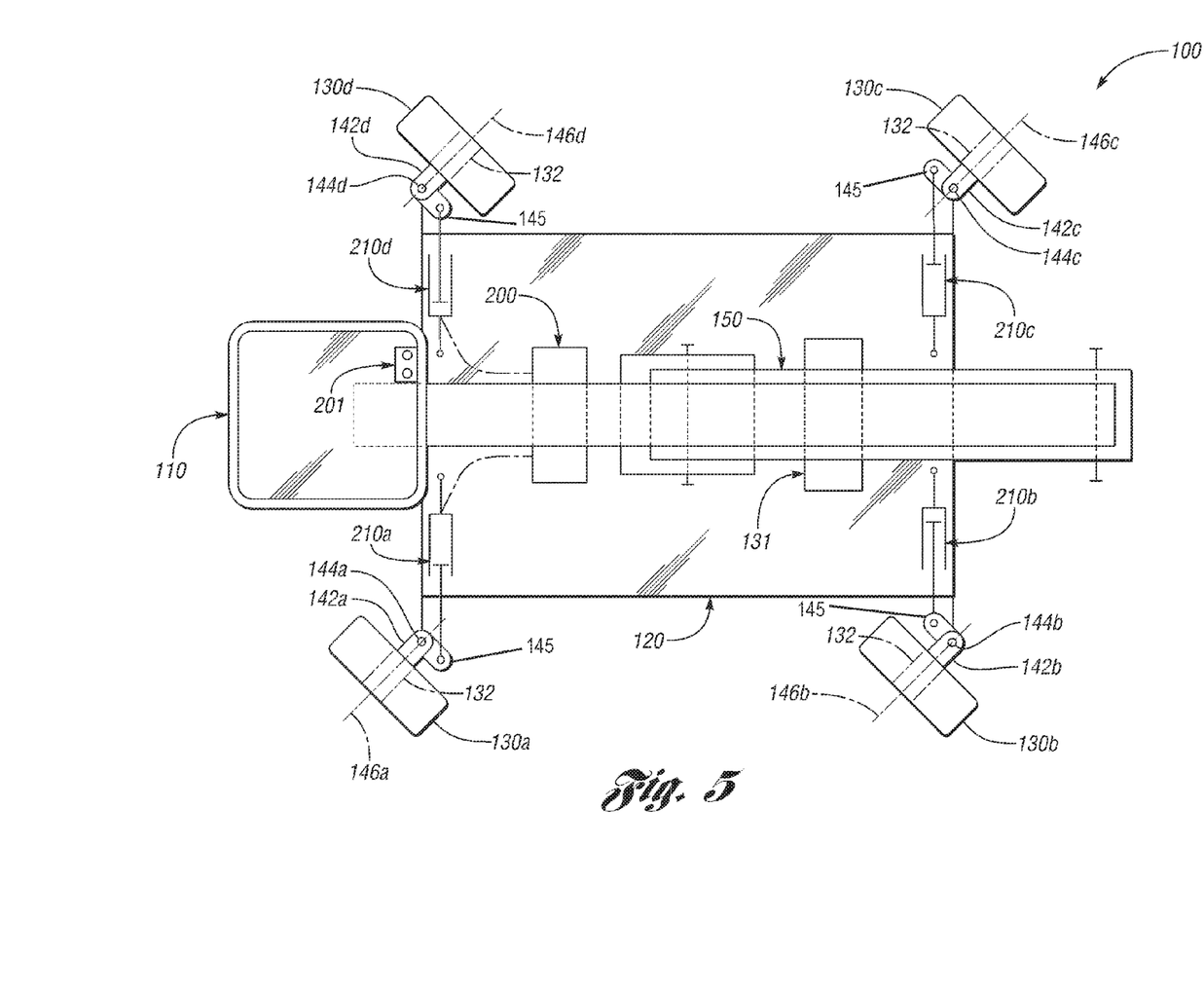
FIG. 5 is a partially schematic top plan view of the an embodiment of vehicle shown in FIG. 1 having still another arrangement of the steering system in accordance with the present disclosure.

As depicted, the chassis 120 generally includes a frame 122 and at least three traction devices, such as wheels 130. The illustrated embodiment shows a vehicle with four wheels 130, although vehicles in accordance with the present disclosure can have greater or fewer wheels or other traction devices. The wheels 130 (individual wheels 130a, 130b and 130d are shown in FIG. 1 or FIG. 2; individual wheel 130c is shown in FIGS. 3-5) support the frame 122 with respect to the support surface S and are configured to move the chassis 120 with respect to the support surface S. Each wheel 130 interacts with the support surface S through a contact patch 132. Although the illustrated embodiment includes wheels 130, other embodiments can include other traction devices suitable for traversing the support surface S.

The chassis 120 includes axles 140 that couple the wheels 130 to the frame 122. According to certain embodiments of the present disclosure, solid axles 140 span the width of the frame 122 with wheels 130 pivotally coupled at opposite ends of the solid axles 140. As shown in FIGS. 1 and 2, a solid axle 140a is rigidly fixed at or near one end of the frame 122 and another solid axle 140b is rigidly fixed at or near an opposite end of the frame 122. According to other embodiments, the frame 122 can be suspended or pivoted on the solid axles 140, or individual axles 140 can independently couple corresponding wheels 130 to the frame 122.

Spindles 142 pivotally couple the wheels 130 to individual ends of the axles 140. Individual spindles 142 are pivotally coupled along a king pin axis 144 (individual king pin axes 144a, 144b and 144d are shown in FIG. 1 or FIG. 2; king pin axis 144c is shown in FIGS. 3-5) at an end of the corresponding axle 140a or 140b. Bearings between the wheels 130 and the spindles 142 facilitate relative rotation on spindle axes 146 (individual spindle axes 146a, 146b and 146d are shown in FIG. 1 or FIG. 2; spindle axis 146c is shown in FIGS. 3-5). The king pin axes 144 extend approximately vertically and the spindle axes 146 extend approximately horizontally. Thus, according to the embodiment shown in FIGS. 1 and 2, individual spindles 142 and their corresponding wheels 130 pivot on the king pin axes 144 in an arcuate path that extends in a horizontally oriented plane. Each king pin axis 144 is offset inboard relative to the contact patch 132 of each wheel 130. In one embodiment, this allows the king pin 144 to be positioned such that it lowers the height of the steering assembly. This geometry may lead to tire scrub when maneuvering under some conditions, but may lead to a simpler control strategy for the steering. In other embodiments, the king pin axis 144 is located at the center of the contact patch 132, or otherwise positioned relative to the contact patch 132 as is known in the art.

According to at least one embodiment of the present disclosure, one or more of the wheels 130 are driven in rotation on the corresponding spindle axis 146. A wheel 130 can be driven by a propulsion system 131 that includes, for example, an internal combustion engine supported by the frame 122 and a drive train for transferring torque from the internal combustion engine to one or more of the wheels 130. An example of a drive train can include a transmission, a drive shaft, and universal joints. Another propulsion system can include an electric power source and at least one electric motor, e.g., a hub motor, to drive one or more of the wheels 130.

The support assembly 150 couples the load carrying structure 110 and the chassis 120, and is configured to move the load carrying structure 110 between a deployed position (the load carrying structure 110 is shown at least partially deployed in FIG. 1) and a stowed position (as shown in FIG. 2) with respect to the chassis 120. In the illustrated embodiment, the support assembly 150 includes a boom 152 with articulated boom segments 152a and 152b. The boom segment 152a is pivotally coupled at its ends by pins 154a and 154b with respect to the frame 122 and the boom segment 152b, respectively. The boom segment 152b is pivotally coupled at its ends by pins 154b and 154c with respect to the boom segment 152a and the load carrying structure 110, respectively. Actuators can be used in a manner well understood to move the boom segments 152*a* and 152*b* with respect to the load carrying structure 110 and the frame 122 between the stowed and deployed positions.

According to certain embodiments of the present disclosure, the vehicle 100 can be maneuvered with a steering system 200. The steering system 200 includes actuators 210 (individual actuators 210*a*, 210*b* and 210*c* are shown in FIG. 1 or FIG. 2; actuators 210*c* is shown in FIGS. 3-5) positioned between the frame 122 and each of the spindles 142. As shown in FIGS. 1 and 2, the actuators 210 are configured to extend and retract so as to pivotally move each of the spindles 142 and therefore individually steer each of the wheels 130.

The steering system 200 may have a control system 201 coupled to the propulsion system 131, the actuators 210, the spindles 142, and wheels 130, so as to control the angular orientation of the wheels relative to the chassis, such as in response to steering or control input from the operator of the vehicle. The control system 201 is configured in one embodiment to allow the operator to simultaneously steer two of the four wheels. The control system 201 is also configured to allow the operator to simultaneously steer all four wheels, as discussed in greater detail below, such as in spot steer, crab steer, two-wheel steer and four-wheel steer arrangements.

Referring now to FIG. 3, a partially schematic top plan view of the vehicle 100 having an arrangement of the steering system to provide steering in accordance with at least an embodiment of the present disclosure is illustrated. As shown in FIG. 3, the individual actuators 210*b* and 210*c* pivot the spindles 142*b* and 142*c* so that the wheels 130*b* and 130*c* on the axle 140*b* are steered outwardly relative to one another. In the two wheel spot steer, the individual actuators 210*a* and 210*d* position the spindles 142*a* and 142*d* so that the wheels 130*a* and 130*d* on the axle 140*a* are aligned with one another, and are non-steering wheels. FIG. 3 illustrates a two wheel spot steer of the vehicle 100. The wheels 130*b*-*c* propel the vehicle 100, while the wheels 130*a, d* rotate in opposite directions on the underlying support surface S as the vehicle 100 turns. In an alternative embodiment, four wheels 130*a*-*d* may pivot to provide for a four wheel spot steer.

Pivoting two wheels 130 inwardly or outwardly relative to one another is referred to as toeing-in or toeing-out, respectively. Specifically, "toe-in" describes a condition where the fronts of two wheels 130 on the same axle 140 or axles on the same end of the vehicle are closer together than at the rear, and "toe-out" describes a condition where the fronts of two wheels 130 on the same axle 140 are further apart than at the rear.

As shown in FIG. 3, the actuators 210 pivot the spindles 142 such that the spindle axes 146 intersect a steer axis 148, which can generally correspond to a central location of the vehicle in one embodiment. The actuators 210*b, c* may be independent or may be linked to one another, for example using a hydraulic line. The spindle axes 146 may intersect a single point along the steer axis 148 or may intersect plural points along the steer axis 148 in the arrangement illustrated in FIG. 3. A single intersection point along the steer axis 148 can occur, for example, when the axles 140 are fixed with respect to the frame 122 such that the wheels 130 do not move vertically with respect to the frame 122, or when the axles 140 move vertically in unison with respect to one another. Plural intersection points along the steer axis 148 occur, e.g., when the axles 140 independently suspend the frame 122 such that at least one of the axles 140 can move independently of another of the axels 140 relative to the frame 122. When the operator activates the control system 201 to provide the steer configuration illustrated, the wheels 130*a*, 130*b*, 130*c*, and 130*d* are simultaneously pivoted relative to the chassis 120 so that all of the wheels are aligned with a circular path having a center point substantially corresponding or aligned with the steer axis 148.

In certain embodiments according to the present disclosure, the steer axis 148 is an approximately vertical axis that extends through a central portion of the frame 122. In other embodiments, the steer axis 148 extends perpendicular to a plane defined by the frame 122. The steer axis 148 can be located anywhere along a centerline of the vehicle, including outside an outer surface of the vehicle. Possible steer axis 148 locations include, but are not limited to: at the center portion of the frame 122, at the center of the front axle 140, at the center of the rear axle 140, in front of the vehicle, and behind the vehicle. By placing the steer axis 148 at the center of the front or rear axle 140, a steer mechanism may not be required on that axle 140. The wheels 130 are rotated about the steer axis 148. A drive motor may not be required on the fixed axle 140. In at least one embodiment, a drive motor and a differential axle are employed because the differential axle permits the wheels 130 to counter rotate without rotating the drive motor. The opposite axle may have a steer mechanism so that the axes 140 of the steered wheels intersect at the steering axis 148 at the center of the fixed axle 140. The fixed axle wheels 130 rotate along a circle and the steered wheels 130 rotate along a second, larger concentric circle.

In at least one embodiment, the support assembly 150 can be coupled to the frame 122 generally along the steer axis 148 such that the base of the support assembly 150 rotates in unison with the chassis 120 about the steer axis 148. In another embodiment, the support assembly 150 is coupled to the frame 122 in a manner to maximize outreach of the load carrying structure 110, to increase stability of the vehicle 100 when the support assembly 150 is deployed, or a combination thereof. In yet another embodiment, an axis of the pin 154*a* that couples the boom segment 152*a* with respect to the frame 122 can intersect the steer axis 148.

When the steering system 200 is in the steer configuration, as illustrated, the propulsion system 131 drives at least one of the wheels so as to cause all of the wheels 130*a*-*d* to roll over the support surface along the circular path. In one embodiment, at least a pair of the wheels (for example, wheels 130*b*-*c* and 130*b*) are simultaneously driven by the propulsion system. In yet another embodiment, all of the wheels 130*a*-*d* are actively driven by the propulsion system 131 in a four-wheel drive configuration. When the propulsion system 131 drives the wheels 130*a*-*d*, the wheels 130*a*, 130*b* on one left side of the vehicle (e.g., the left side) rotate in one direction (e.g., forwardly), and the wheels 130*c*, 130*d* on the other side of the vehicle (e.g., right side) rotate in an opposite direction (e.g., rearwardly). To turn the vehicle 100 in a clockwise circle (when viewed from above), the wheels 130*a*-*d* are driven by the propulsion system 131 such that they rotate in a counter-clockwise direction. Alternatively, to turn the vehicle in a counter-clockwise circle (when viewed from above), the wheels 130*a*-*d* are driven such that they rotate in a clockwise direction. The propulsion system 131 is coupled to the steering system so that when the steering system 200 is in the steer configuration, the propulsion system 131 can actively drive the wheels 130*a*-*d* on opposite sides of the vehicle in opposite directions, thereby provide a smooth actively driven rotation of the vehicle 100 about the steer axis 148. The propulsion system 131 can be configured to monitor any slippage of the wheels 130*a*-*d* when driving in the steer configuration to shift or adjust power away from any slipping wheels to ensure positive traction of the vehicle 100 during rotation.

In operation, the arrangement of the steering assembly 200 as shown in FIG. 3 and at least one wheel 130a-d being driven along the circular path causes the vehicle 100 to spin about the steer axis 148. Accordingly, the load carrying structure 110 and the support assembly 150 will spin as a unit about the steer axis 148, thereby making it possible for the vehicle 100 to exclude a swing bearing. In a conventional vehicle, a swing bearing or a similar feature facilitates rotation about a vertical axis between a support assembly and a chassis. Eliminating the swing bearing between the chassis 120 and the support assembly 150 gives the vehicle 100 a lower center of gravity and greater stability or lower weight relative to a comparable utility vehicle with a conventional swing bearing. Moreover, additional features that are conventionally associated with swing bearings, e.g., rotary couplings for hydraulic lines, motors for turning the support assembly 150 with respect to the chassis 120, etc. are superfluous on vehicles in accordance with embodiments of the present disclosure, thereby reducing the weight and manufacturing cost of the vehicle.

With reference now to FIG. 4, a partially schematic top plan view of the vehicle 100 having another arrangement of the steering system 200 that allows for front wheel or rear wheel steering is illustrated. When the vehicle 100 is traveling in a straight line forwardly or rearwardly, the wheels 130 are substantially parallel. The vehicle 100 is turned via the steering system 200 by simultaneously turning the steering wheels (i.e., the two front wheels or the two rear wheels. The steering system 200 can also be used in an all-wheel steer system wherein all of the wheels are turned generally in the same direction so the vehicle will follow an arcuate path (that has a center point remote from the vehicle). The four wheels 130a-d are typically turned at slightly different angular orientations relative to the chassis to accommodate for the different turn radius needed by each wheel to smoothly roll along the arcuate path substantially without scrubbing.

According to at least an embodiment of the present disclosure, the first and second parallel planes $P_1$ and $_2$ are approximately vertical planes that include the axles 140a and 140b of the vehicle 100, respectively. The individual spindle axes 146 according to certain embodiments of the present disclosure may all be parallel to each other in the arrangement illustrated in FIG. 4. In other embodiments, one or more of the wheels 130a-d may include positive or negative camber such that the spindle axes 146 lying in an individual plane $P_1$ or $P_2$ are not parallel to one another in the arrangement illustrated in FIG. 4.

In operation, the arrangement of the steering assembly 200 as shown in FIG. 4 and at least one wheel 130a-d being driven causes the chassis 110 to travel approximately perpendicular to the first and second parallel planes $P_1$ and $P_2$. As with conventional utility vehicles, this travel is commonly referred to as forward or reverse depending on the direction the at least one driving wheel is turning. In the present disclosure, forward travel refers to the load carrying structure 110 trailing the vehicle 100; however, forward travel could also refer to the load carrying structure 110 leading the vehicle 100.

With reference to FIG. 5, a partially schematic top plan view of the vehicle 100 having another arrangement of the steering system to provide crab steering is illustrated. Individual actuators 210 are connected to an associated spindle 142 via a pivotal connection 145. In particular, the individual actuators 210 pivot each of the corresponding spindles 142 and wheels 130 such that all of the spindle axes 146 are approximately parallel and oblique with respect to the first and second parallel planes P1 and P2 shown in FIG. 4. The vehicle 100 will travel in a crabwise manner when at least one wheel 130 is driven and the steering system is configured in the arrangement illustrated in FIG. 5.

Figure 6:
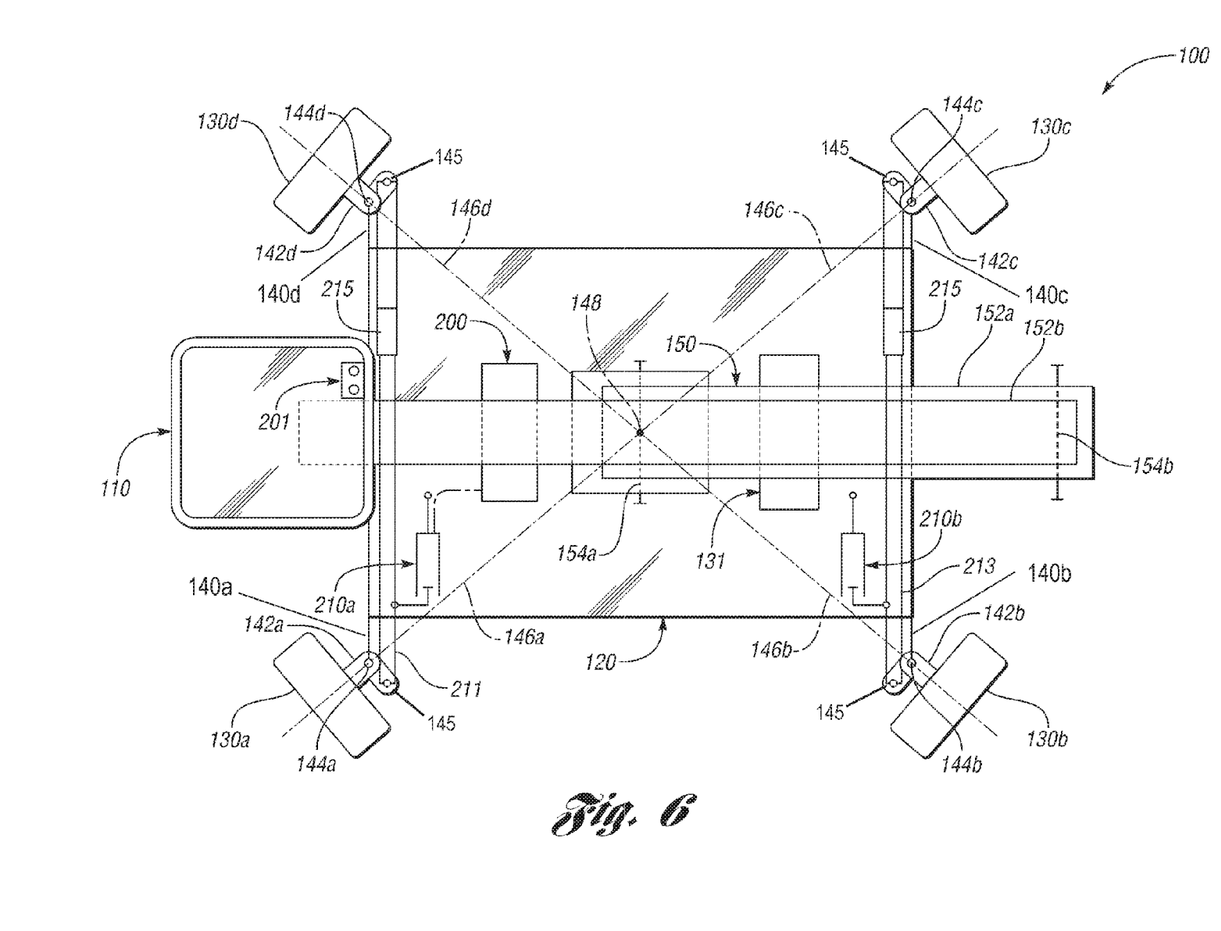
FIG. 6 is a partially schematic top plan view of another embodiment of the vehicle shown in FIG. 1.

Referring now to FIG. 6, a partially schematic top plan view of the vehicle 100 having an arrangement of the steering system to provide steering in accordance with at least an embodiment of the present disclosure is illustrated. Individual axles 140a-d independently couple corresponding wheels 130a-d, respectively, to the frame 122. As shown in FIG. 6, a first individual actuator 210a is connected to a first tie rod 211. The tie rod 211 may be connected via pivotal connections 145 to the spindles 142a and 142d so that the wheels 130a and 130d are steered as the tie rod 211 is actuated by the first individual actuator 210a. The tie rod 211 is variable in length, and in one embodiment is a two piece tie rod 211 which is extensible using an actuator 215. The actuator 215 extends the tie rod 211 when actuated to place the wheels 130a and 130d into the spot steering geometry as shown. When the actuator 215 is retracted, the tie rod 211 is shortened and the wheels 130a and 130d return to a straight-ahead steering orientation.

Similarly, a second individual actuator 210b is connected to a second tie rod 213. The second tie rod 213 may be connected via pivotal connections 145 to the spindles 142b and 142c so that the wheels 130b and 130c are steered as the tie rod 213 is actuated by the second individual actuator 210b. Tie rod 213 is also extensible using an actuator 215, and is shown in the extended position in FIG. 6. The arrangement of the wheels 130 may be controlled utilizing the tie rods 211 and 213 and actuators 210a and 210b to be configured inwardly or outwardly relative to one another as discussed above. The tie rods 211, 213 may be a two piece tie rod and actuated between an extended and retracted position using a rotary actuator, a hydraulic actuator having one cylinder and one piston, a hydraulic actuator have one cylinder and two pistons, or other mechanisms as are known in the art. The tie rods 211, 213 are adjustable between an extended position (as shown, spot steer configuration), a retracted position (with the wheels 130 in a normal driving configuration), or incrementally between the two. Alternatively, only one extensible tie rod may be used with the vehicle 100, where the pair of wheels connected to the extensible tie rod could be placed into a spot steer configuration, and the other pair of wheels would rotate and follow while spot steering. Any suitable tie rods 211 and 213 are contemplated within the scope of the disclosed embodiments.

Referring back to FIGS. 1-5, in an embodiment, the support assembly 150 is connected to the frame 122 of the vehicle chassis 120 such that it cannot sweep or rotate relative to the chassis 120 about a vertical axis of the chassis 120. The support assembly 150 stays aligned with the stability footprint or tip line of the vehicle 100 while the load carrying structure 110 is deployed outboard of the footprint. The stability footprint 214 is generally defined by the vehicle 100 footprint over the support surface S. By not having a swing bearing connecting the support assembly 150 to the chassis 120, the vehicle 100 does not require a counterweight system or additional ground support system to counteract the support assembly acting as a moment arm when it is deployed. The support assembly 150 remains aligned with the longitudinal higher stability region of the stability footprint 214, and the vehicle 100 acts to counterweight the support assembly 150 when in an extended or deployed position. The ability to steer the vehicle 100, such as through spot steering or crabwise steering provides the ability to position the support assembly 150 as desired by positioning the vehicle 100 itself.

Certain embodiments according to the present disclosure can provide a number of advantages. For example, a vehicle can be maneuvered amongst obstacles because of the available range of steering options including spot steering and crabwise steering, as well as conventional two-wheel or four-wheel steering. Vehicles in accordance with the present disclosure may also be driven at greater speeds than a comparable conventional vehicle because the relative orientation of the support assembly with respect to the chassis can be set to increase the vehicle stability. Specifically, vehicles according to the present disclosure do not swing the support assembly about a vertical axis relative to the chassis and therefore the footprint of the vehicle under the support assembly can remain constant. This can reduce the amount of weight required to counter extension of a swinging boom in a conventional vehicle. This also allows the support assembly and other vehicle components, e.g., engine, to be mounted at a desirable position on the chassis to enhance stability.

While embodiments of have been illustrated and described herein, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed is:

1. A vehicle for lifting a load with respect to a support surface, comprising:
    a chassis having a footprint and a vertical axis;
    a load carrying structure adapted to carry a load;
    a support assembly coupling the load carrying structure and the chassis, the support assembly fixed relative to the vertical axis of the chassis, the support assembly being adapted to move the load carrying structure relative to the chassis between a stowed position and a deployed position, wherein the deployed position is outboard of the footprint of the chassis;
    a plurality of wheels adapted to roll on an underlying support surface, each wheel interfacing with the underlying surface through a respective contact patch;
    a plurality of axles coupling the wheels to the chassis via a plurality of spindles, each spindle adapted to support one of the plurality of wheels for rotation about a spindle axis; and
    a steering system having at least one extensible tie rod having a first terminal end connected to one of the spindles, and a second terminal end connected to another of the spindles, the extensible tie rod having a first rod section and a second rod section connected to one another using an actuator in an intermediate region of the tie rod, the steering system configured to position the wheels between a driving arrangement and a rotating arrangement relative to the chassis;
    wherein, in the rotating arrangement, the actuator is configured to extend the tie rod until each spindle axis of the spindles connected to the tie rod intersect a steer axis, the steer axis being an approximately vertical axis extending through a central portion of the chassis, the vehicle configured to rotate and spot steer about the steer axis in the rotating arrangement; and
    wherein, in the driving arrangement, the actuator is configured to retract the tie rod such that each spindle axis of the spindles connected to the tie rod are along a common axis.

2. The vehicle of claim 1 further comprising a propulsion system coupled to the plurality of wheels and adapted to drive at least one of the plurality of wheels.

3. The vehicle of claim 1 wherein the plurality of wheels comprises a first wheel and a second wheel coupled to a first side of the chassis and a third wheel and a fourth wheel coupled to a second side of the chassis generally opposite the first side, and wherein the tie rod is connected to spindles of the first and third wheels.

4. The vehicle of claim 1 wherein the chassis is configured to travel approximately perpendicular to parallel planes provided along a front side and a rear side of the chassis when the steering system is in a drive arrangement.

5. The vehicle of claim 1 wherein the steering system is configured to position the plurality of wheels in a third arrangement with respect to the chassis, wherein each spindle axes of the plurality of wheels is approximately parallel and obliquely oriented with respect to parallel planes provided along a front side and a rear side of the chassis.

6. The vehicle of claim 1 further comprising a steering actuator connected from the chassis to the first rod section of the extensible tie rod and configured to pivot the spindles connected to the tie rod with respect to the chassis.

7. The vehicle of claim 3 further comprising a propulsion system coupled to and configured to drive the first, second, third, and fourth wheels such that in the rotating arrangement the first and second wheels are rotated by the propulsion system in a first direction relative to the chassis and the third and fourth wheels are rotated by the propulsion system in a second direction relative to the chassis, the second direction opposed to the first direction.

8. The vehicle of claim 1 wherein the plurality of axles comprises two axles and the plurality of spindles comprises two spindles, and wherein each axle extends between king pin axes that are pivotally coupled to said spindles relative to the chassis.

9. The vehicle of claim 8 wherein the king pin axes are offset from the contact patches of the wheels on an inboard side of the vehicle.

10. The vehicle of claim 1 wherein the load carrying structure further comprises a personnel carrying structure, and wherein the support assembly further comprises an extendible support coupling the personnel carrying platform to the chassis, the extendible support being configured to move the personnel carrying structure relative to the chassis between the stowed and the deployed position.

11. The vehicle of claim 1 wherein the load carrying structure further comprises a fork, and wherein the support assembly further comprises an extendible support coupling the fork to the chassis, the extendible support being configured to move the fork relative to the chassis between the stowed and the deployed position.

12. A drivable lift assembly for lifting a load with respect to a support surface, comprising:
    a chassis having a steer axis extending approximately vertically through a central region of the chassis;
    a load carrying structure adapted to carry a load;
    a support assembly coupling the load carrying structure and the chassis, the support assembly being adapted to move the load carrying structure relative to the chassis between a stowed position and a deployed position, such that the load carrying structure has a raised center of gravity in the deployed position;

first and second pairs of wheels adapted to roll on an underlying support surface, each wheel interfacing with the underlying support surface through a respective contact patch;

a first pair of spindles coupling the first pair of wheels to the chassis via at least one axle, and a second pair of spindles coupling the second pair of wheels to the chassis via at least another axle, each spindle adapted to support one of the wheels for rotation about a spindle axis;

first and second pairs of kingpins, each kingpin pivotally coupling a respective spindle relative to the chassis about a king pin axis extending through the spindle to intersect the associated spindle axis, wherein each kingpin is offset from the contact patch of the wheel on an inboard side of the drivable lift assembly;

a steering system having a plurality of actuators coupled to the first and second pairs of wheels and being adapted to position the wheels between a driving arrangement and a rotating arrangement relative to the chassis, such that in the rotating arrangement each spindle axis of each wheel in the first and second pairs of wheels intersect the steer axis such that the chassis rotates and spot steers about the steer axis; and a propulsion system coupled to the first and second pairs of wheels and adapted to drive the wheels;

wherein each actuator is connected to an associated spindle via a pivotal connection spaced apart and offset from the spindle axis, wherein the pivotal connection lies in a plane defined by a respective spindle axis sweeping from the driving arrangement to the rotating arrangement;

wherein the propulsion system is configured to rotate a first and a second wheel of the first and second pairs of wheels in a forward direction relative to the chassis and rotates a third and a fourth wheel of the first and second pairs of wheels in a reverse direction that is opposite the forward direction when the steering system is in the rotating arrangement to rotate and spot steer the chassis about the steer axis.

13. The drivable lift assembly of claim 12 wherein the chassis, the load carrying structure and the support assembly are fixed relative to one another such that they rotate simultaneously about the steer axis when the steering system is in the rotating arrangement.

14. The drivable lift assembly of claim 12 wherein the chassis has a footprint; and wherein the load carrying structure extends outside of the footprint in the deployed position.

15. The drivable lift assembly of claim 12 wherein the steering system comprises an extensible tie rod having a first terminal end connected to one of the first pair of spindles, and a second terminal end connected to the other of the first pair of spindles, the extensible tie rod having a first rod section and a second rod section connected to one another using an actuator in an intermediate region of the tie rod, wherein the actuator is configured to extend the tie rod such that the spindle axes of each spindle connected to the tie rod intersect the steer axis in the rotating arrangement, and wherein the actuator is configured to retract the tie rod in the driving arrangement such that the spindle axes of each spindle connected to the tie rod lie along a common axis.

16. A vehicle for lifting a load with respect to a support surface, comprising:

a chassis having a footprint and a vertical axis;

a load carrying structure adapted to carry a load;

a support assembly coupling the load carrying structure and the chassis, the support assembly being adapted to move the load carrying structure relative to the chassis between a stowed position and a deployed position, such that the load carrying structure has a raised center of gravity in the deployed position;

a first pair of wheels adapted to roll on an underlying support surface and coupled to the chassis using a first axle and a first pair of spindles, each spindle of the first pair of spindles adapted to support a respective wheel of the first pair of wheels for rotation about a spindle axis;

a second pair of wheels adapted to roll on an underlying support surface and coupled to the chassis using a second axle and a second pair of spindles, each spindle of the second pair of spindles adapted to support a respective wheel of the second pair of wheels for rotation about a spindle axis; and a steering system having a first extensible tie rod associated with the first pair of spindles and a second extensible tie rod associated with the second pair of spindles, each tie rod having a first terminal end connected to one spindle, and a second terminal end connected to the other spindle, each extensible tie rod having a first rod section and a second rod section connected to one another using an actuator in an intermediate region of the tie rod;

wherein the steering system is configured to position the first and second pairs of wheels between a driving arrangement and a rotating arrangement relative to the chassis;

wherein the steering system is configured to extend the first and second extensible tie rods in the rotating arrangement until the vehicle is configured to rotate about a steer axis extending approximately vertically through a central portion of the chassis, each spindle axis of the first and second pairs of spindles intersecting the steer axis in the rotating arrangement; and wherein the steering system is configured to retract the first and second extensible tie rods in the driving arrangement such that each spindle axis of the first pair of spindles are along a first common axis and each spindle axis of the second pair of spindles are along a second common axis.

17. The vehicle of claim 16 wherein the steer axis extending approximately vertically thought the central portion of the chassis is further defined as extending vertically through the central portion of the chassis such that the vertical axis of the chassis is coaxial with the steer axis.

18. The vehicle of claim 16 further comprising a propulsion system coupled to each wheel in the first and second pairs of wheels and adapted to drive the first and second pairs of wheels;

wherein the propulsion system is configured to rotate one wheel in each of the first and second pairs of wheels in a forward direction relative to the chassis and rotate the other wheel in each of the first and second pairs of wheels in a reverse direction that is opposite the forward direction when the steering system is in the rotating arrangement to rotate and spot steer the chassis about the steer axis.

* * * * *